United States Patent [19]
Yokoyama et al.

[11] Patent Number: 5,438,206
[45] Date of Patent: * Aug. 1, 1995

[54] POSITIONING DEVICE

[75] Inventors: Kazuo Yokoyama; Motoshi Shibata, both of Hirakata, Japan

[73] Assignee: Matsushita Electric Industrial Co., Ltd., Osaka, Japan

[*] Notice: The portion of the term of this patent subsequent to Feb. 15, 2011 has been disclaimed.

[21] Appl. No.: 70,682

[22] Filed: Jun. 2, 1993

[51] Int. Cl.⁶ .................................................. H01J 37/20
[52] U.S. Cl. .............................. 250/424.11; 250/306; 73/105
[58] Field of Search ............. 250/306, 442.11, 423 F; 73/105

[56] References Cited

U.S. PATENT DOCUMENTS

| | | | |
|---|---|---|---|
| 4,447,731 | 5/1984 | Kuni et al. | 250/442.11 |
| 4,516,029 | 5/1985 | Tucker | 250/442.11 |
| 4,785,177 | 11/1988 | Besocke | 250/442.11 |
| 4,837,445 | 6/1989 | Nishioka et al. | 250/442.11 |
| 4,877,957 | 10/1989 | Okada et al. | 250/306 |
| 4,891,526 | 6/1990 | Reeds | 250/442.11 |
| 5,103,095 | 4/1992 | Elings et al. | 250/306 |
| 5,286,977 | 2/1994 | Yokoyama et al. | 250/306 |

FOREIGN PATENT DOCUMENTS 53-109660 9/1978 Japan.
63-281002 11/1988 Japan.

OTHER PUBLICATIONS

Catalogue of Nanoscope II by Digital Instruments, Inc.

*Primary Examiner*—Bruce C. Anderson
*Attorney, Agent, or Firm*—Fish & Richardson

[57] ABSTRACT

Three point contact legs are provided on the bottom of a housing of a probe head for sliding on a surface of a sample to be observed or on a sliding surface provided in the vicinity of the sample. The housing is held by a thin plate spring which is provided in a manner to be parallel with the surface of the sample. The sample or probe head is driven by an X-Y drive unit for positioning the relative position of the probe to the sample.

32 Claims, 7 Drawing Sheets

POSITIONING DEVICE

FIELD OF THE PRESENT INVENTION

The present invention relates to a positioning device for samples used in a scanning tunneling microscope (STM), atomic force microscope (AFM), other scanning probe microscopes or their applied apparatuses.

BACKGROUND OF THE INVENTION

Recently, the scanning tunneling microscope (STM) has been developed as an apparatus capable of observing the surface structure of a substance surface at an atomic order resolution.

The measuring principle of the scanning tunneling microscope is described below.

On the sample surface to be measured, a probe made of an extremely sharp pointed metal tip is brought within a distance of about 10 angsttoms, and a bias voltage of about 10 mV to 2 V is applied between the sample and the probe, and then a tunneling current of several nA flows. The tunneling current is very sensitive to the distance between the sample and probe, and this distance may be kept constant by employing the feedback control.

The probe is attached to an actuator composed of a piezoelectric element capable of inching in three axial directions of X, Y, Z. By relatively moving sample and probe in the X-Y direction in raster scan, the distance between the sample and probe is kept constant by the feedback control of the Z direction, while the change of voltage applied to the position control of the Z direction directly expresses the topography of the sample surface.

Such scanning tunneling microscope technology has produced, peripheral technologies such as the atomic force microscope (AFM), near field optical microscope (NFOM), other observation apparatuses, and ultrahigh-precision processing machines capable of manipulating atoms and molecules. These technologies commonly possess the means of scanning the sample surface while maintaining an atomic order distance between the sample and probe, and including their observation apparatuses, they are commonly called a near field microscope (NFM) or a scanning probe microscope (SPM).

In order to scan while maintaining the atomic order distance between the probe and sample, it is of prime importance that mechanical vibrations affecting distance fluctuations should be thoroughly eliminated. And in the positioning device of the invention, it is also required that this be the first condition.

In addition, in the analysis of a semiconductor element, or analysis of a superlattice quantum effect device, when applying the scanning tunneling microscope, the positioning mechanism is needed to search for a specific position on the sample. Furthermore, in a ultrahigh-precision processing machine utilizing the scanning tunneling microscopic technology, a highly accurate positioning device for controlling X-Y position coordinates is needed.

As an example of a simple positioning function for the scanning tunneling microscope of the type for use in an air atmosphere without installing a specific positioning device, the probe head mounting the scanning probe is manually moved while observing the sample and scanning probe from an oblique direction by an optical microscope.

Moreover, in an example of a positioning device for the scanning tunneling microscope of the type for use in a vacuum, the sample was positioned by a driving device while observing the sample and the scanning probe from an oblique direction by a scanning electron microscope (SEM).

In the conventional scanning tunneling microscope, however high in precision the absolute positioning function of the X-Y position coordinates of the sample and scanning probe may be, so far as the mechanical vibrations cannot be eliminated completely, it is not sufficient for accurate X-Y positioning.

When scanning at a distance of an atomic order from the scanning probe to the sample, the mechanical vibrations affecting the fluctuations of the distance must be thoroughly eliminated, and in the conventional positioning device, it is difficult to satisfy both vibration control and accurate X-Y positioning at the same time. Actually, the above-mentioned conventional SEM or STM does not have any function for precisely and absolutely positioning the X-Y position coordinates.

SUMMARY OF THE INVENTION

To solve the above problems, it is hence a primary objective of the invention to present a positioning device high in mechanical stability in scanning of the scanning probe, capable of positioning the X-Y position coordinates, and applicable to the positioning probe microscope or its applied apparatuses.

To achieve the above-mentioned objective, the invention presents a positioning device comprising: an X-Y scanning mechanism capable of scanning and driving in two-dimensional directions; a sample table mounted on the X-Y positioning mechanism and having a table face on which a sample is to be fixed; a probe head having a probe, a housing and three point contact legs provided on the bottom face of the housing and sliding directly on a surface of the sample; and a thin plate spring provided in a manner to be substantially parallel to the surface of the sample, and which holds the housing.

The present invention also presents a positioning device comprising: an X-Y positioning mechanism capable of positioning in two-dimensional directions; a sample table provided on the X-Y positioning mechanism and having a table face on which a sample is to be fixed and a sliding surface provided in the vicinity of the sample; a probe head having a probe, a housing and three point contact legs provided on the bottom face of the housing and sliding on the sliding surface; and a thin plate spring provided in a manner to be substantially parallel to the sliding surface, and which holds the housing.

The present invention further presents a positioning device comprising: a sample table having a table face on which a sample is to be fixed; an X-Y positioning mechanism capable of positioning in two-dimensional directions; a probe head having a probe, a housing and three point contact legs provided on the bottom face of the housing and sliding directly on a surface of the sample; and a thin plate spring fixed on the X-Y positioning mechanism at end parts thereof in a manner to be substantially parallel to the surface of the sample, and which holds the housing.

The present invention further presents a positioning device comprising: a sample table having a table face on which a sample is to be fixed and a sliding surface provided in the vicinity of the sample; an X-Y positioning mechanism capable of positioning in two-dimensional directions; a probe head having a probe, a housing and three point contact legs provided on the bottom face of the housing and sliding on the sliding surface; and a thin plate spring fixed on the X-Y positioning mechanism at end parts thereof in a manner to be substantially parallel to the sliding surface, and which holds the housing.

In the above constitution, it is preferable that the shape of the thin plate spring is axis symmetrical to the center shaft of the probe head.

It is also preferable that a vibration dampening material is adhered to the thin plate spring.

It is furthermore preferable that the vibration dampening material is synthetic rubber.

It is preferable that the three point contact legs are steel balls engaged with guide holes.

It is preferable that the thin plate spring is made of stainless steel or an iron-nickel alloy with a low coefficient of thermal expansion.

It is preferable that the housing, X-Y drive unit, and thin plate spring are made of an iron-nickel alloy with a low coefficient of thermal expansion.

It is preferable that the sliding surface is a surface of an optical flat made of quartz or glass ceramics with a low coefficient of thermal expansion.

It is preferable that the three point contact legs have a function to clamp the housing on the sliding surface.

According to the four embodiments of the invention mentioned previously, the housing of the probe head possessing the probe contacts the surface of the sample directly, or sits on the sliding surface provided in the vicinity of the sample by the three point contact legs, which are provided on the bottom of the housing; hence, as the measure of vibration control affecting the distance fluctuations between the probe and sample, the resonance frequency of the entire mechanism can be set extremely high, so that stable probe positioning may be realized.

Furthermore, since the housing of the probe head is thrust by a thin plate spring, the three point contact legs for stabilizing the entire housing are not set aside, and when standing still, the probe head can be fixed at high rigidity for movement in the X-Y direction. Accordingly, when the absolute positioning mechanism is employed in the X-Y positioning mechanism, displacement errors such as backlash of the drive transmission system are decreased, and the relative positions of the sample and probe may be easily and precisely determined.

According to the first and third embodiments, a part of the surface of the flat plate sample is used as a sliding surface. Therefore, even if the surface of the sample is wavy, the probe head can be positioned to follow the waviness of the sample. As a result, the negative effect due to the waviness of the sample can be eliminated. In this case, the above-mentioned restraining means of the probe head serves as a mechanical high-pass filter having a cut-off frequency corresponding to the distances of the three point contact legs.

According to the second and fourth embodiments, a section of the surface provided in the vicinity of the sample on the sample table is used as a sliding surface. Therefore, the three point contact legs do not slide or roll on the surface of the sample directly. As a result, the entire surface of the sample can be observed without scratching its surface.

In all four embodiments, since the shape of the thin plate spring is axis symmetrical to the center shaft of the probe head, if thermal drift occurs due to thermal expansion or the like of the member composing the positioning device, effects of thermal expansion are canceled by each other near the center of the thin plate spring, so that displacement of the probe head in the X-Y direction may be minimized.

Yet, in the four embodiments, since a vibration dampening material is adhered to the thin plate spring, the positional fluctuations in the X-Y direction due to resonance of the thin plate spring itself may be kept to a minimum limit.

And also, in all four embodiments, since the three point contact legs are constituted by steel balls engaged with guide holes, the probe smoothly moves on the surface of the sample or the sliding surface.

Furthermore, in each embodiment, since the thin plate spring is made of stainless steel or an iron-nickel alloy with a low coefficient of thermal expansion, thermal drift due to thermal expansion of the members may be effectively prevented.

Still more, all four embodiments, since the housing, X-Y drive unit and the thin plate spring are similarly made of stainless steel or an iron-nickel alloy with a low coefficient of thermal expansion, thermal drift due to thermal expansion of the members may be effectively prevented.

Still more, in the second and fourth embodiments, since the sliding surface is an optical flat made of quartz or glass ceramics with a low coefficient of thermal expansion, the probe head can be moved in the X-Y direction stably.

Still more, in the second and fourth embodiments, since the three point contact legs have a function to clamp the housing on the sliding surface, the housing can be fixed on the sliding surface at a high rigidity, so that stable probe scanning may be realized.

DESCRIPTION OF THE PREFERRED EMBODIMENTS

Referring now to the drawings, some of the embodiments of the invention are described in detail below. The following embodiments are the preferred embodiments applied to the positioning devices used in the scanning tunnel microscope (STM) and its applied working apparatuses.

First Embodiment

Figure 1:
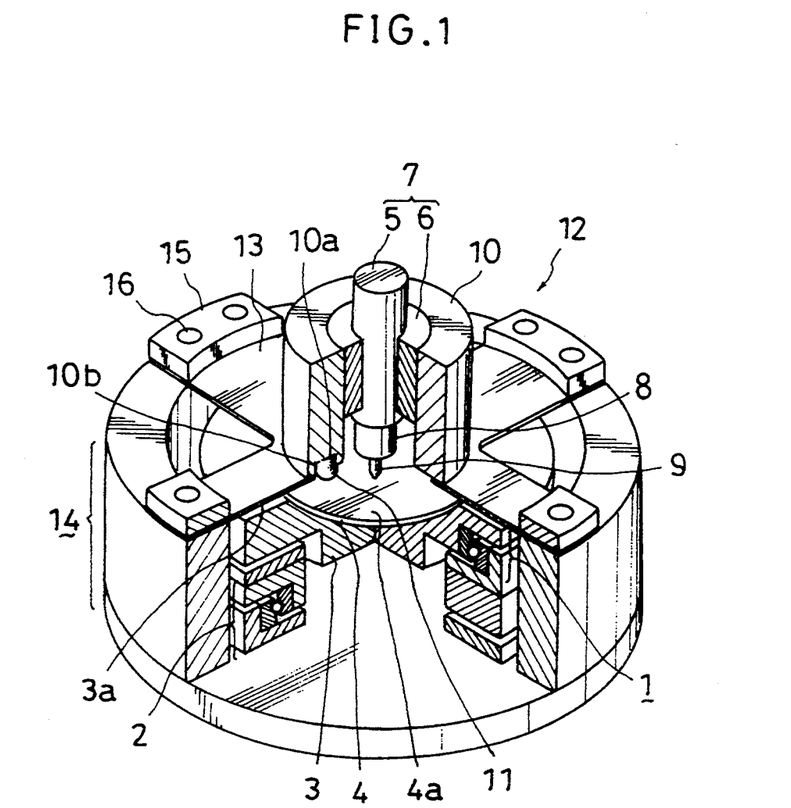
FIG. 1 is a partial cut-away perspective view showing a first embodiment of a positioning device of the present invention.
Figure 2:
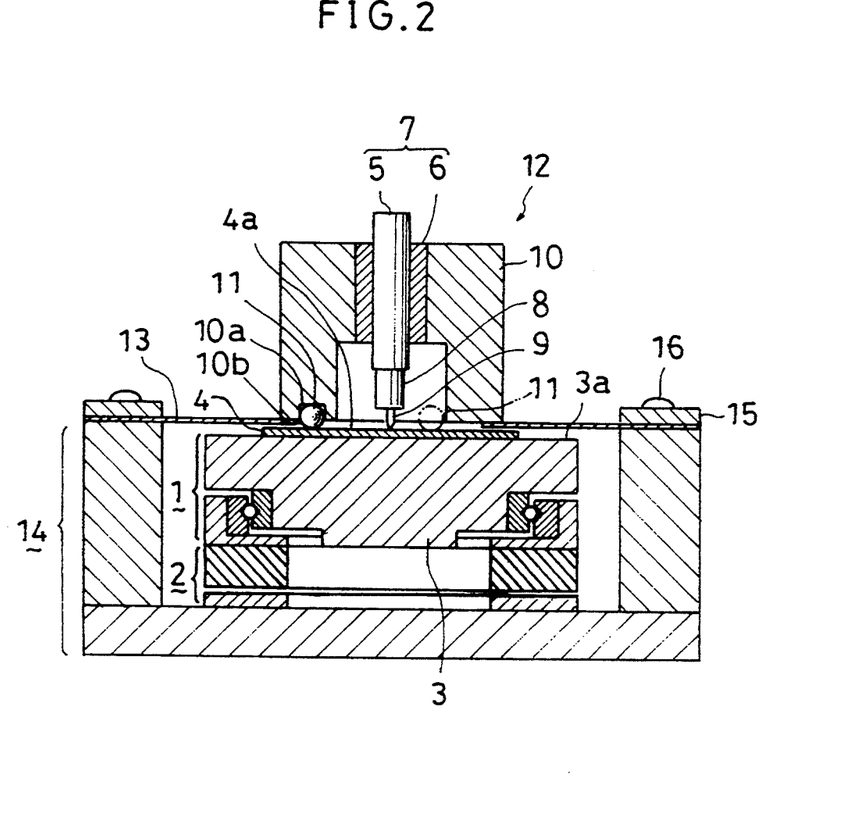
FIG. 2 is a central cross-sectional view showing the first embodiment of the positioning device of the present invention.
Figure 3:
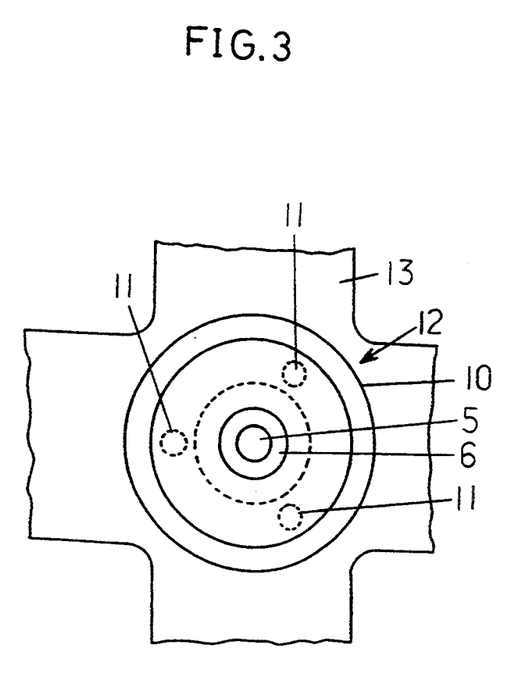
FIG. 3 is a partial plan view in the vicinity of a probe head of the first embodiment of the positioning device of the present invention.

A first preferred embodiment of a positioning device of the present invention is described referring to FIGS. 1, 2 and 3. FIG. 1 is a partial cut-away perspective view showing the first embodiment of the positioning device. FIG. 2 is a central cross sectional view showing the positioning device. FIG. 3 is a partial plan view in the vicinity of a probe head of the first embodiment of the positioning device. In FIGS. 1 and 2, a Y-axis drive unit (Y-axis drive stage) 2 is mounted on a base 14. An X-axis drive unit (X-axis drive stage) 1 is mounted on this Y-axis drive unit 2. Therefore, the X-axis drive unit 1 and Y-axis drive unit 2 form an X-Y positioning mechanism (X-Y stage) on the whole.

A sample table 3 is mounted on X-axis drive unit 1. On a table surface 3a of sample table 3, a flat plate-shaped sample 4, such as a piece of Si wafer or GaAs wafer, is fixed.

In a system used in a normal air atmosphere, sample 4 is easily fixed on sample table 3 by sucking the air from the table surface side. On the other hand, in a system used in a vacuum, the peripheral part of sample 4 is mechanically clamped on sample table 3.

A probe head 12 of the first embodiment has a configuration described below. A worm-type drive unit (inch worm drive unit) 7, which comprises a columnar movable shaft 5 and a cylindrical fixed shaft 6, is fixed on a housing 10 for coarse positioning along the Z-axis. A cylindrical (tube-shaped) scanner 8, which can scan in X-Y axes and finely adjust Z-axis movement, is fixed in the movable shaft 5. Furthermore, a STM probe 9 which serves as a scanning probe is provided on an end of scanner 8.

Incidentally, the worm type drive unit 7 and cylindrical scanner 8 may be replaced by commercial products using piezoelectric elements, PZT piezoelectric elements (lead zirconate titanate piezoelectric elements). As a STM probe 9, a tip made of W, PtIr or the like is used.

The outer appearance of the housing 10 of probe head 12 is axis-symmetrical in an approximately cylindrical shape, and the fixed shaft 6 of the worm-type drive unit 7 is fixed on the center axis thereof. Furthermore, three steel balls 11 are provided in a manner to be engaged with guide holes 10a formed on the bottom face of housing 10. These three balls 11 constitute three point contact legs. Probe head 12 is constituted by such elements designated by numerals 5 to 11.

Probe head 12 is placed on sample 4 by the three point contact legs 11. In addition, ends of a thin plate spring 13 are fixed to the bottom 10b of housing 10 of the probe head 12. The other ends of thin plate spring 13 are fixed on the base via fixing plates 15 and screws 16. Thereby, the thin plate spring 13 is made substantially parallel to the face of sample 4, which is to be measured. As a thin plate spring 13, a spring made of stainless steel or invar, which is an iron-nickel alloy (Fe-36%Ni) with a low coefficient of thermal expansion in a thickness of 0.05 to 0.2 mm, is used and desirably provided axis-symmetrically.

In this embodiment, detachment of sample 4 is executed after removing the fixing plates 15 and screws 16, and further removing probe-head 12 and the thin plate spring 13.

It is suitable to add a mechanism for lowering the sample table 3 in the Z-axis and for pulling out the sample 4 in the X-axis or Y-axis under the condition of horizontally holding the probe head 12 by the thin plate spring 13.

As configured above, the restraining means of the motion element (probe head 12) by the combination of three point contacts and thin plate spring for composing the first embodiment of the present invention acts advantageously in the case of the scanning probe microscope or its applied apparatuses as follows.

When the probe head 12 is not restrained at all, a total of six degrees of freedom are present including the translation motion in three directions of X, Y, Z, and rotary motions around the X, Y, Z axes. When the relative position of sample 4 and probe head 12 is defined by three point contacts, however, the three degrees of freedom consisting of the X-Y direction of the sample plane and the rotary motion around the Z-axis are left over, while the other motions are restrained.

On the other hand, the flat thin plate spring is easily deflected in a direction parallel to the plane, and there is an extremely high rigidity in the direction in its flat surface. By making use of this nature to use as the means for restraining the other degrees of freedom, the total freedom of probe head 12 may be restrained without isolating the stable three point contacts.

As a result, at three positions close to the scanning point of sample 4, probe head 12 can be mechanically coupled to sample 4, and probe head 12 can be set at a high resonance frequency, so that an extremely high antivibration effect may be obtained for the mechanism for stably scanning the atomic order topography on the surface of sample 4.

Generally, to realize Z-axis control of the atomic order, an atom of about 1 angstrom in diameter to be measured must be controlled within mechanical vibrations of 0.01 angstrom or less; in the construction of mounting a probe head on a base through an X-Y drive unit, it is difficult to obtain a high antivibration effect because the resonance frequency is lowered by the effects of the members low in stiffness among the entire apparatus construction, such as the effects of lowering of stiffness by beam structure and of stiffness by the X-Y drive unit.

By contrast, according to the constitution of the above-mentioned first embodiment of the invention (similar to the other embodiments described below), by composing the probe head at a high resonance frequency, the resonance frequency of the entire system can be set high. Furthermore, a part of the surface of the flat plate sample 4 is used as a sliding surface in the first embodiment. Therefore, even if the surface of the sample 4 is wavy, probe head 12 can be positioned to follow the waviness of the sample 4. As a result, the negative effect due to the waviness of sample 4 can be eliminated. In this case, the above-mentioned restraining means of probe head 12 serves as a mechanical high-pass filter having a cut-off frequency corresponding to the distances of the three point contact legs.

Furthermore, an apparatus such as the scanning probe microscope is generally installed on a vibration-proof device such as an air spring, and the high resonance frequency is cut off by the vibration-proof device; therefore, by enhancing the resonance frequency of the apparatus, a high vibration-preventive performance is obtained by those synergistic effects.

Second Embodiment

Figure 4:
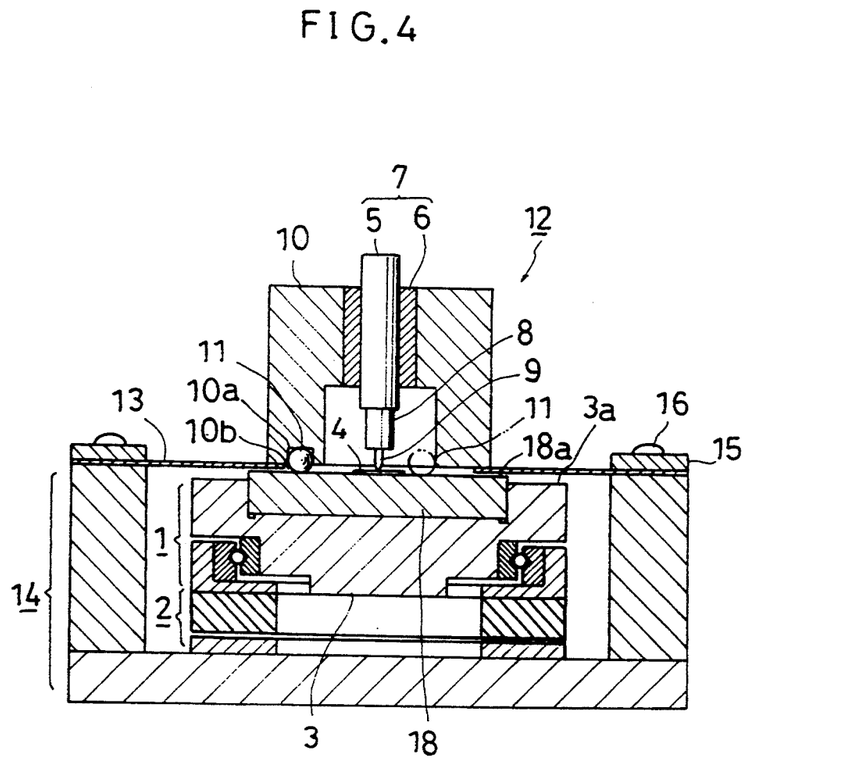
FIG. 4 is a central cross-sectional view showing a second embodiment of a positioning device of the present invention.

A second preferred embodiment of a positioning device of the present invention is described referring to FIG. 4, a central cross-sectional view of the positioning device. Configuration and function of the elements designated in FIG. 4 by the same numerals in the above-mentioned first embodiment are substantially the same as those in the first embodiment. Therefore, explanations of the elements are omitted.

The main difference from the above-mentioned first embodiment is that the three point contact legs 11 which are provided on the bottom face of housing 10 of the probe head 12 do not slide or roll on the surface of sample 4 directly, but rather slide or roll on the sliding surface 18a of the flat plate 18 which is provided on the sample table 8. As the flat plate 18, an optical flat made of quartz or glass ceramics with a low coefficient of thermal expansion and having a flatness of $\lambda/20$ is suitable.

With such a configuration, the distance between each contact point of the three point contact legs 11 becomes longer than that in the above-mentioned first embodiment when the same sized samples are observed, and thereby the resonance frequency decreases. However, the entire surface of sample 4 can be observed or worked effectively. Furthermore, the positioning is independent of the flatness of the surface of table 8, but is dependent upon the flatness of the sliding face 18a of flat plate 18.

Third Embodiment

Figure 5:
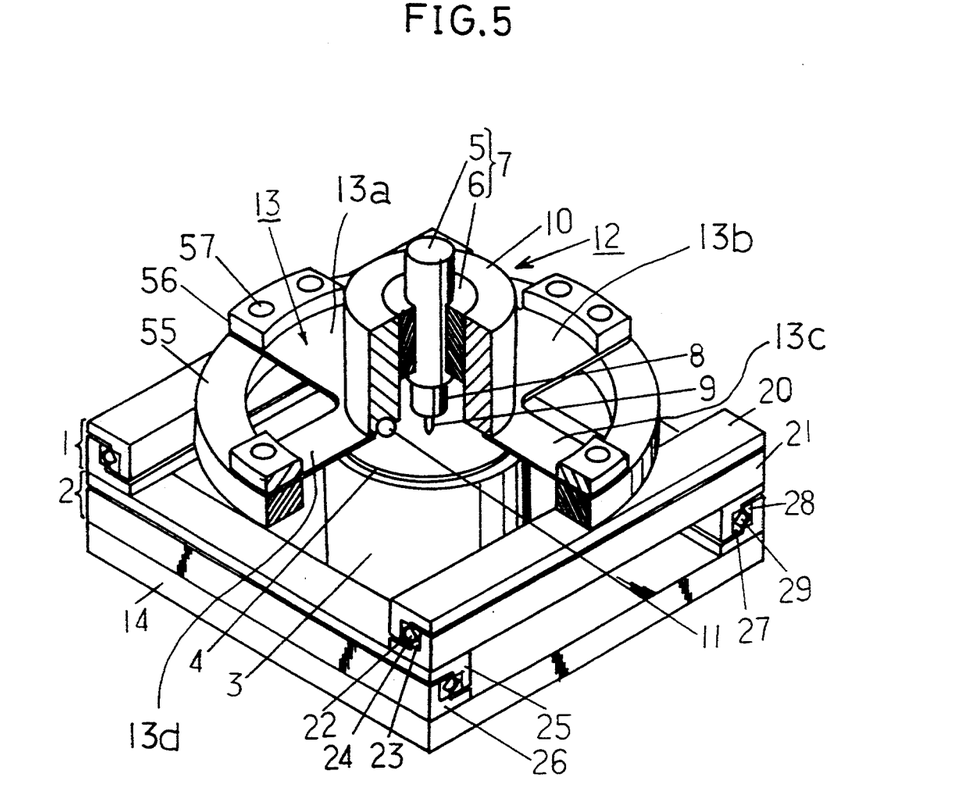
FIG. 5 is a partial cut-away perspective view showing a third embodiment of a positioning device of the present invention.
Figure 6:
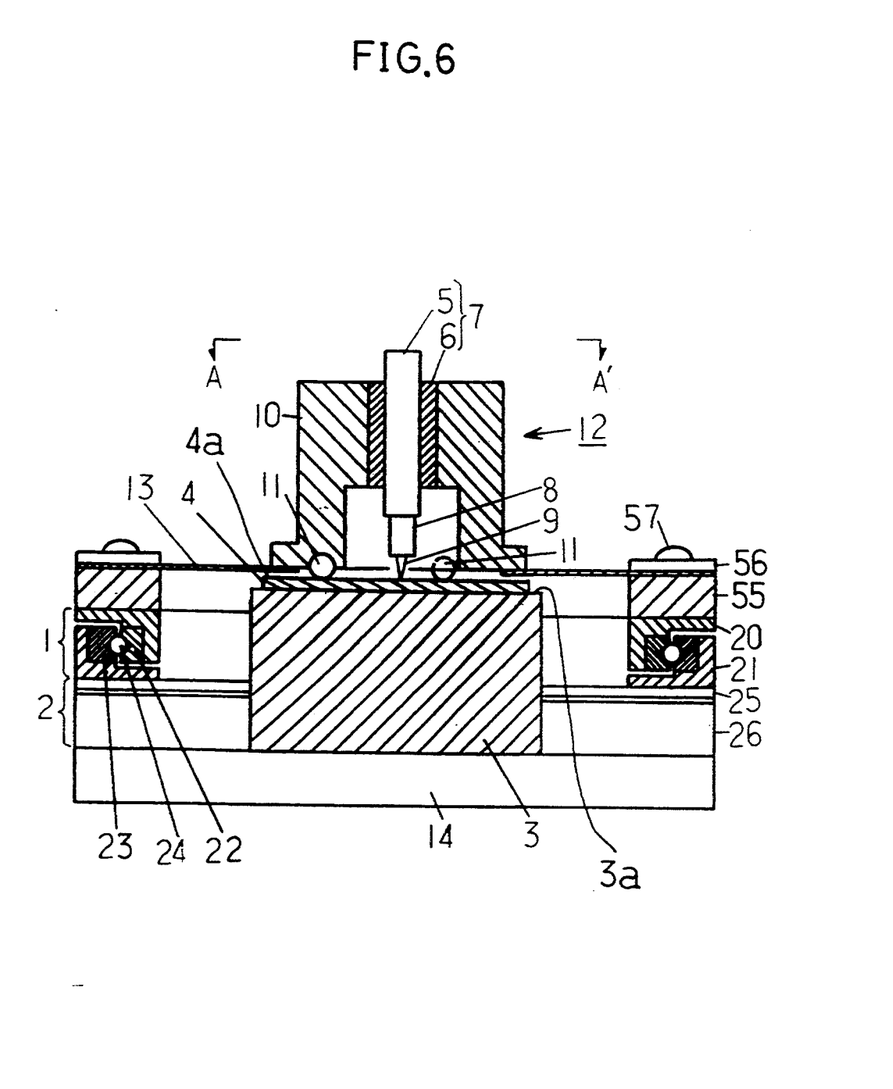
FIG. 6 is a central cross-sectional view showing the third embodiment of the positioning device of the present invention.

A third preferred embodiment of a positioning device of the present invention is described referring to FIGS. 5 and 6. FIG. 5 is a partial cut-away perspective view showing the third embodiment of the positioning device of the present invention, and FIG. 6 is a central cross-sectional view of the embodiment. Configuration and function of the elements designated in FIGS. 5 and 6 by the same numerals in the above-mentioned first embodiment are substantially the same as those in the first embodiment. Therefore, explanations of the elements are omitted.

As shown in FIG. 5, the thin plate spring 13 having four arm parts 13a to 13d, which are axial-symmetrical to the Z-axis of the probe, is fixed on the housing 10 of the probe head 12 in a manner so that the thin plate spring 13 is made parallel to the sampling surface of the sample 4. Each end of the arm parts 13a to 13d of the thin plate spring 13 is fixed on a ring member 55 by fixing plates 56 and screws 57. Ring member 55 is mounted on the X-axis drive unit 1 which is provided on the base 14. X-axis drive unit 1 is mounted on the Y-axis drive unit 2. By driving X-axis drive unit 1 and Y-axis drive unit 2, ring member 55 is moved in X-Y axes directions. As a result, probe head 12, which is mounted on ring member 55 via the thin plate spring 13, is also moved in X-Y axes directions.

X-axis drive unit 1 is composed of an upper member 20 and a lower member 21, and upper member 20 possesses a rail 22 having a V-section groove. Lower member 21 also possesses a rail 23 having a similar V-section groove, and a steel ball 24 is inserted between the rails 22 and 23, so that the upper member 20 and lower member 21 may slide in the X-axis direction parallel to each other. Lower member 21 is fixed to the upper member 25 of the Y-axis drive unit 2 mentioned below.

The Y-axis drive unit 2 is similarly composed of an upper member 25 and a lower member 26, and upper member 25 possesses a rail 27 having a V-section groove, and lower member 26 also possesses a rail 28 having a V-section groove. A steel ball 29 is inserted between the rails 27 and 28, so that upper member 25 and lower member 26 may slide in the Y-axis direction parallel to each other.

Herein, the stepping motor, inch worm motor, other driving sources, and drive transmission mechanism such as ball screw are of the known art, and are omitted in the drawings and explanations.

Incidentally, the X-axis drive unit 1 and the Y-axis drive unit 2 are not limited to the above-mentioned configuration. A known drive unit of high precision is permissible. Furthermore, instead of using the ball bearings 24 and 29, plural roller bearings can be used in a manner so that their rotation axes are crossed to each other and the shapes of the rails 22, 23, 27 and 28 are changed to be engaged with the roller bearings. That is, a change in the configuration which does not deviate from the purpose of the present invention is acceptable.

As the thin plate spring 13, a plate of stainless steel or invar, which is an iron-nickel alloy (Fe-36%Ni) with a low coefficient of thermal expansion in a thickness of 0.05 to 0.3 mm, is desired.

In this embodiment, detachment of the sample 4 is executed after removing fixing plates 56 and screws 57, and further removing probe-head 12 and thin plate spring 13.

Fourth Embodiment

Figure 7:
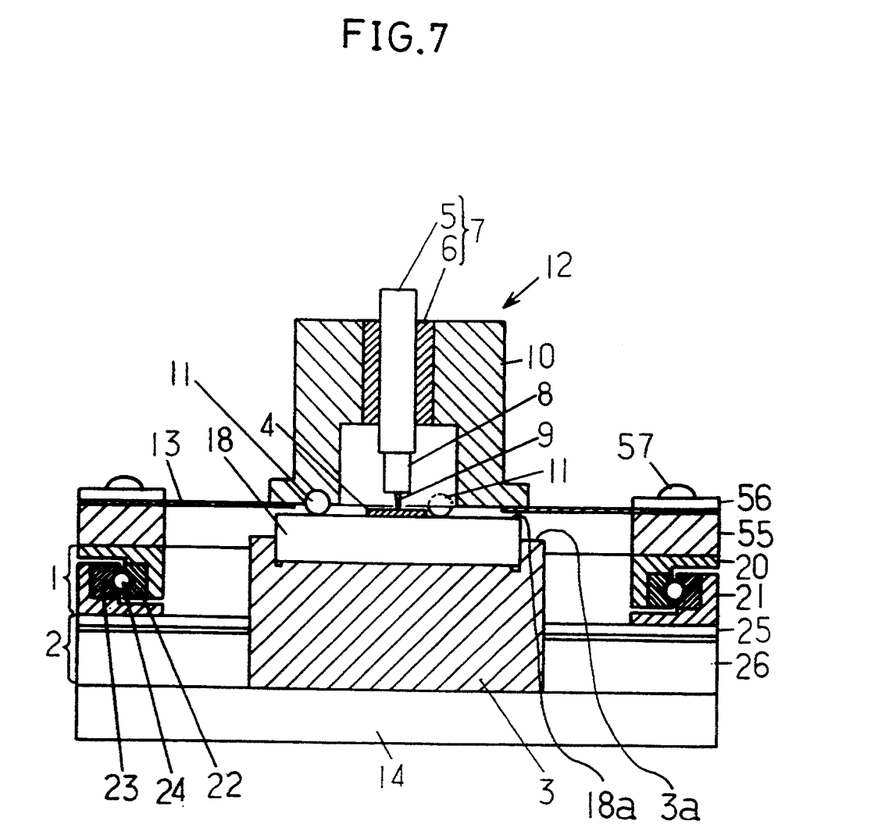
FIG. 7 is a central cross-sectional view showing a fourth embodiment of a positioning device of the present invention.

A fourth preferred embodiment of a positioning device of the present invention is described referring to FIG. 7, which is a central cross-sectional view of the positioning device. Configuration and function of the elements designated in FIG. 7 by the same numerals in the above-mentioned third embodiment are substantially the same as those in the third embodiment. Therefore, explanations of the elements are omitted.

The main difference from the above-mentioned third embodiment is that the three point contact legs 11 which are provided on the bottom face of the housing 10 of the probe head 12 do not slide or roll on the surface of sample 4 directly, but rather slide or roll on the sliding surface 18a of the flat plate 18, which is provided on the sample table 3. As flat plate 18, an optical flat made of quartz or glass ceramics with a low coefficient of thermal expansion is suitable. In this embodiment, the optical flat having a flatness of $\lambda/20$ is used; however, this is not limitative.

By such a configuration, the distance between each contact point of the three point contact legs 11 becomes longer than that in the above-mentioned third embodiment, and therefore the resonance frequency decreases. However, the entire surface of sample 4 can be observed or worked effectively. Furthermore, the positioning is independent of the flatness of the surface of table 3, but is dependent upon the flatness of the sliding face 18a of flat plate 18.

In the foregoing embodiments, it is desired that the shape of the thin plate spring 13 be formed axis symmetrically to the center shaft of probe head 12; if thermal drift occurs due to thermal expansion of the members composing the positioning device, thermal effects near the center of the thin plate spring 13 may be canceled by each other, thereby minimizing the displacement of probe head 12 in the X-Y direction.

In the embodiments, the members composing the device, in particular, the housing 10, fixed table 3, X, Y drive units 1 and 2, thin plate spring 13 and base 14 are preferably made of materials with a low coefficient of thermal expansion such as invar, which is an iron-nickel alloy (Fe-36%Ni), and together with the effects of axis symmetry of the thin plate spring 13, a very high thermal stability may be realized.

Incidentally, when using the positioning device in the foregoing embodiments in an air atmosphere, the acoustic vibration propagating in the air affects the thin plate spring 13, which may induce slight vibrations in the X-Y direction. However, practically harmful vibrations can be prevented by gluing a vibration dampening material to the surface of thin plate spring 13, such as synthetic rubber, preferably vulcanized fluoroplastic rubber known by the trade name of "Viton" (of DuPont), using a rubber sheet or the like in a thickness of about 0.5 mm. The thickness of thin plate spring 13 is desired to be 0.05 to 0.3 mm. In this embodiment, a thin plate having a thickness of 0.25 mm is used as the material for thin plate spring 13. However, this is not limitative.

The position of the probe is detected by using a known optical interferometer. However, the explanation of position detection of the probe is omitted here.

The foregoing embodiments relate to the positioning device mainly used in the scanning tunneling microscope (STM), atomic force microscope (AFM), and their applied processing apparatuses, but it is also useful as a positioning device for various observation apparatuses developed from the STM or AFM, or processing devices.

As described herein, the positioning device of the invention can set the resonance frequency of the entire mechanism at a very high level since the housing abuts against the abutting plane through three point contact legs while being thrust by the thin plate spring, when relatively scanning between the housing of the probe head and the sample, so that a stable probe scanning is realized together with a high vibration-preventive effect.

Besides, since the shape of the thin plate spring is formed axis symmetrically to the center shaft of the probe head, thermal drift due to thermal expansion or the like of the members composing the positioning device may be effectively prevented.

Furthermore, in the first and third embodiments, the three point contact legs 11 of probe head 12 slide or roll on the surface of sample 4 directly. Therefore, even if the surface of sample 4 exhibits waviness, probe head 12 can be positioned to follow the waviness of sample 4, and the negative effect due to this waviness can be eliminated.

On the other hand, in the second and fourth embodiments, the three point contact legs 11 of probe head 12 slide or roll on the sliding face 18a of the flat plate 18, which is the optical flat. Hence, the entire surface of sample 4 can be observed without scratching its surface.

Moreover, as a vibration dampening material is adhered to the thin plate spring 13, positional variations in the X-Y direction due to resonance of the thin plate spring 13 may be effectively controlled.

Moreover, in the second and fourth embodiments, it is suitable to add clamping function to the three point contact legs. For example, if we chose dielectric materials for the legs and the table, they can be clamped electrostatically by applying clamping voltage. Mechanical clamping using piezoelectric materials is also possible. In this case, the probe housing can be fixed on the table at higher rigidity, so that stable probe scanning may be realized.

The invention may be embodied in other specific forms without departing from the spirit or essential characteristics thereof. The present embodiment is to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A positioning device comprising:
   a sample table having a table face on which a sample is to be fixed;
   an X-Y positioning mechanism, holding said sample table and capable of positioning said sample table in two dimensions;
   a housing including three point contact legs provided on a bottom face of said housing and sliding directly on a surface of said sample;
   a fixed base;
   a thin plate spring, coupled to said fixed base and substantially parallel to the surface of said sample, said thin plate spring holding said housing; and
   a probe head having a probe, coupled to said housing.

2. A positioning device according to claim 1, wherein said thin plate spring is axially symmetrical to a center shaft of said probe head.

3. A positioning device according to claim 1, further comprising a vibration dampening material adhered to said thin plate spring.

4. A positioning device according to claim 3, wherein said vibration dampening material is synthetic rubber.

5. A positioning device according to claim 1, wherein said three point contact legs are steel balls held in guide holes in said housing.

6. A positioning device according to claim 1, wherein said thin plate spring is made of stainless steel or an iron-nickel alloy with a low coefficient of thermal expansion.

7. A positioning device according to claim 1, wherein said housing, X-Y drive unit, and thin plate spring are made of an iron-nickel alloy material with a low coefficient of thermal expansion.

8. A positioning device comprising:
   a sample table having a table face on which a sample is to be fixed and a sliding surface provided in the vicinity of said sample;
   an X-Y positioning mechanism, holding said sample table and capable of positioning said sample table in two-dimensions;
   a housing including three point contact legs provided on a bottom face of said housing and sliding directly on said sliding surface;
   a fixed base;
   a thin plate spring, coupled to said fixed base and substantially parallel to said sliding surface, , said thin plate spring holding said housing; and
   a probe head having a probe, coupled to said housing.

9. A positioning device according to claim 8, wherein said thin plate spring is axially symmetrical to a center shaft of said probe head.

10. A positioning device according to claim 8, further Comprising a vibration dampening material adhered to said thin plate spring.

11. A positioning device according to claim 10, wherein said vibration dampening material is synthetic rubber.

12. A positioning device according to claim 8, wherein said three point contact legs are steel balls held in guide holes in said housing.

13. A positioning device according to claim 8, wherein said thin plate spring is made of stainless steel or an iron-nickel alloy with a low coefficient of thermal expansion.

14. A positioning device according to claim 8, wherein said housing, X-Y drive unit, and thin plate spring are made of an iron-nickel alloy material with a low coefficient of thermal expansion.

15. A positioning device according to claim 8, wherein said sliding surface is a surface of an optical flat made of quartz or glass ceramics with a low coefficient of thermal expansion.

16. A positioning device in accordance with claim 8, wherein said three point contact legs include means for clamping said housing on said sliding surface.

17. A positioning device comprising:
a sample table having a table face on which a sample is to be fixed;
an X-Y positioning mechanism, holding said sample table and capable of positioning said sample table in two dimensions;
a housing including three point contact legs provided on a bottom face of said housing and sliding directly on a surface of said sample;
a thin plate spring fixed on said X-Y positioning mechanism at end parts thereof in a manner to be substantially parallel to the surface of said sample, said thin plate spring holding said housing; and
a probe head having a probe, coupled to said housing.

18. A positioning device according to claim 17, wherein said thin plate spring is axially symmetrical to a center shaft of said probe head.

19. A positioning device according to claim 17, further comprising a vibration dampening material adhered to said thin plate spring.

20. A positioning device according to claim 19, wherein said vibration dampening material is synthetic rubber.

21. A positioning device according to claim 17, wherein said three point contact legs are steel balls held in guide holes in said housing.

22. A positioning device according to claim 17, wherein said thin plate spring is made of stainless steel or an iron-nickel alloy with a low coefficient of thermal expansion.

23. A positioning device according to claim 17, wherein said housing, X-Y drive unit, and thin plate spring are made of an iron-nickel alloy material with a low coefficient of thermal expansion.

24. A positioning device comprising:
a sample table having a table face on which a sample is to be fixed and a sliding surface provided in the vicinity of said sample;
an X-Y positioning mechanism, holding said sample table and capable of positioning said sample table in two dimensions;
a housing including three point contact legs provided on a bottom face of said housing and sliding on said sliding surface;
a thin plate spring fixed on said X-Y positioning mechanism at end parts thereof in a manner to be substantially parallel to said sliding surface, said thin plate spring holding said housing; and
a probe head having a probe, coupled to said housing.

25. A positioning device according to claim 24, wherein a shape of said thin plate spring is axially symmetrical to a center shaft of said probe head.

26. A positioning device according to claim 24, further comprising a vibration dampening material adhered to said thin plate spring.

27. A positioning device according to claim 26, wherein said vibration dampening material is synthetic rubber.

28. A positioning device according to claim 24, wherein said three point contact legs are steel balls held in guide holes in said housing.

29. A positioning device according to claim 24, wherein said thin plate spring is made of stainless steel or an iron-nickel alloy with a low coefficient of thermal expansion.

30. A positioning device according to claim 24, wherein said housing, X-Y drive unit, and thin plate spring are made of an iron-nickel alloy material with a low coefficient of thermal expansion.

31. A positioning device according to claim 24, wherein said sliding surface is a surface of an optical flat made of quartz or glass ceramics with a low coefficient of thermal expansion.

32. A positioning device in accordance with claim 24, wherein said three point contact legs have a function to clamp said housing on said sliding surface.

* * * * *